United States Patent
Heo et al.

(10) Patent No.: US 11,176,688 B2
(45) Date of Patent: Nov. 16, 2021

(54) METHOD AND APPARATUS FOR EYE TRACKING

(71) Applicant: SAMSUNG ELECTRONICS CO., LTD., Suwon-si (KR)

(72) Inventors: Jingu Heo, Yongin-si (KR); Dongwoo Kang, Seoul (KR); Byong Min Kang, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 100 days.

(21) Appl. No.: 16/540,204

(22) Filed: Aug. 14, 2019

(65) Prior Publication Data
US 2020/0143547 A1 May 7, 2020

(30) Foreign Application Priority Data
Nov. 6, 2018 (KR) .................. 10-2018-0135191

(51) Int. Cl.
G06T 7/246 (2017.01)
G06K 9/00 (2006.01)

(52) U.S. Cl.
CPC ............ G06T 7/248 (2017.01); G06K 9/0061 (2013.01); G06K 9/00604 (2013.01); G06K 9/00617 (2013.01); G06T 2207/20081 (2013.01); G06T 2207/30201 (2013.01)

(58) Field of Classification Search
CPC ........... G06T 7/248; G06T 2207/20081; G06T 2207/30201; G06K 9/0061; G06K 9/00604; G06K 9/00617; G06K 9/00597
See application file for complete search history.

(56) References Cited

U.S. PATENT DOCUMENTS

| | | | |
|---|---|---|---|
| 9,270,981 B2 | 2/2016 | Park et al. | |
| 10,178,380 B2 | 1/2019 | Kang et al. | |
| 10,282,608 B2* | 5/2019 | Kuldkepp | G06K 9/00617 |
| 2004/0005083 A1* | 1/2004 | Fujimura | A61B 3/113 |
| | | | 382/103 |
| 2011/0199468 A1* | 8/2011 | Gallagher | H04N 13/139 |
| | | | 348/59 |

(Continued)

FOREIGN PATENT DOCUMENTS

| | | |
|---|---|---|
| JP | 2018-506781 A | 3/2018 |
| KR | 10-2014-0147748 A | 12/2014 |

(Continued)

OTHER PUBLICATIONS

Gwon et al. "Gaze Tracking System for User Wearing Glassees" published online Jan. 27, 2014, <https://www.ncbi.nlm.nih.gov/pmc/articles/PMC3958289/> (Year: 2014).*

*Primary Examiner* — Ming Y Hon
(74) *Attorney, Agent, or Firm* — Sughrue Mion, PLLC

(57) ABSTRACT

Provided is a method and apparatus for eye tracking. An eye tracking method includes detecting an eye area corresponding to an eye of a user in a first frame of an image; determining an attribute of the eye area; selecting an eye tracker from a plurality of different eye trackers, the eye tracker corresponding to the determined attribute of the eye area; and tracking the eye of the user in a second frame of the image based on the selected eye tracker, the second frame being subsequent to the first frame.

20 Claims, 8 Drawing Sheets

(56) References Cited

U.S. PATENT DOCUMENTS

| | | | | |
|---|---|---|---|---|
| 2011/0199469 A1* | 8/2011 | Gallagher | ............ | H04N 13/351 |
| | | | | 348/60 |
| 2013/0247175 A1* | 9/2013 | Nechyba | ................. | G06F 21/32 |
| | | | | 726/19 |
| 2014/0205143 A1* | 7/2014 | Zhang | ................ | G06K 9/00845 |
| | | | | 382/103 |
| 2015/0016674 A1* | 1/2015 | Cho | ........................ | G06F 3/038 |
| | | | | 382/103 |
| 2015/0070273 A1* | 3/2015 | He | ......................... | G06F 3/013 |
| | | | | 345/156 |
| 2015/0309569 A1 | 10/2015 | Kohlhoff et al. | | |
| 2016/0117554 A1* | 4/2016 | Kang | ................... | G06K 9/2018 |
| | | | | 348/78 |
| 2016/0156902 A1 | 6/2016 | Lee et al. | | |
| 2017/0053211 A1 | 2/2017 | Heo et al. | | |
| 2017/0249509 A1* | 8/2017 | Blixt | ................. | G06K 9/00604 |
| 2018/0098057 A1* | 4/2018 | Heo | ................... | G06K 9/00261 |
| 2018/0120932 A1 | 5/2018 | Sengelaub et al. | | |
| 2018/0150134 A1 | 5/2018 | Lee et al. | | |
| 2019/0129165 A1 | 5/2019 | Kang et al. | | |
| 2019/0130579 A1 | 5/2019 | Heo et al. | | |
| 2019/0317597 A1* | 10/2019 | Aleem | ...................... | G06T 7/73 |
| 2020/0019763 A1* | 1/2020 | Iyer | ................... | G06K 9/00604 |

FOREIGN PATENT DOCUMENTS

| | | |
|---|---|---|
| KR | 10-1508842 B1 | 4/2015 |
| KR | 10-2017-0070110 A | 6/2017 |
| WO | 2012/047375 A1 | 4/2012 |

* cited by examiner

Input image

METHOD AND APPARATUS FOR EYE TRACKING

CROSS-REFERENCE TO RELATED APPLICATION

This application is based on and claims priority from Korean Patent Application No. 10-2018-0135191, filed on Nov. 6, 2018 in the Korean Intellectual Property Office, the disclosure of which is incorporated herein by reference in its entirety.

BACKGROUND

1. Field

Methods and apparatuses consistent with a method and apparatus for eye tracking are provided.

2. Description of the Related Art

Currently, as a method for solving an issue of classifying an input pattern into a specific group, studies are actively ongoing to apply an effective pattern recognition method of a human to an actual computer. One of the studies relates to an artificial neural network acquired by modeling characteristics of biological neurons of a human using mathematical expressions. To prevent the input pattern from being classified into the specific group, the artificial neural network uses an algorithm that mimics a capability of a human, that is, learning. Through this algorithm, the artificial neural network may generate mapping between input patterns and output patterns, which is represented that the artificial neural network has the learning ability. Also, the artificial neural network has a generalization ability of generating a relatively correct output for an input pattern that is not used for learning base on a learning result.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

According to an aspect of the disclosure, there is provided an eye tracking method comprising: detecting an eye area corresponding to an eye of a user in a first frame of an image; determining an attribute of the eye area; selecting an eye tracker from a plurality of different eye trackers, the eye tracker corresponding to the determined attribute of the eye area; and tracking the eye of the user in a second frame of the image based on the selected eye tracker, the second frame being subsequent to the first frame.

The determining the attribute of the eye area may comprise: analyzing the eye area to detect at least one of a type of a light source, presence of glasses, presence of sunglasses, or presence of reflection of light; and determining the attribute of the eye area based on the at least one of the type of a light source, the presence of glasses, the presence of sunglasses, or the presence of reflection of light.

The attribute of the eye area maybe determined based on an attribute classifier, and the attribute classifier maybe pretrained to output a classification result including at least one of a first attribute component associated with a type of a light source corresponding to a training image, a second attribute component associated with presence of glasses in the training image, a third attribute component associated with presence of sunglasses in the training image, or a fourth attribute component associated with presence of reflection of light in the training image, in response to an input of the training image.

The determining of the attribute of the eye area may comprise: inputting the eye area to an attribute classifier; acquiring, from the attribute classifier, a classification result including at least one of a first attribute component associated with a type of a light source corresponding to the first frame, a second attribute component associated with presence of glasses in the first frame, a third attribute component associated with presence of sunglasses in the first frame, or a fourth attribute component associated with presence of reflection of light in the first frame; and determining the attribute of the eye area based on the classification result.

The plurality of eye trackers may comprise: a first eye tracker configured to process an input image of a first attribute including glasses or sunglasses and reflection of light; a second eye tracker configured to process an input image of a second attribute including sunglasses in addition to the input image of the first attribute; and a third eye tracker configured to process an input image of a third attribute in addition to the input image of the first attribute and the input image of the second attribute.

The first eye tracker maybe pretrained based on a training image of the first attribute including the glasses or the sunglasses and the reflection of light, the second eye tracker maybe pretrained based on a training image of the second attribute including the sunglasses in addition to the training image of the first attribute, and a third eye tracker maybe pretrained based on a training image of the third attribute in addition to the training image of the first attribute and the training image of the second attribute.

The eye area maybe detected using an eye detector, and the eye detector maybe pretrained based on training data including a visible image and an infrared ray (IR) image.

The tracking of the eye of the user may comprise: extracting feature points of the eye of the user from the eye area; determining a tracking area in which the eye of the user is to be tracked based on the extracted feature points; and tracking the eye of the user in the second frame based on the tracking area.

The method may further comprise changing an operational state of an IR light source in response to a failure in detecting the eye area.

The method may further comprise verifying whether the eye of the user is successfully detected in the second frame; consecutively tracking the eye of the user in a third frame that is a subsequent frame of the second frame using the selected eye tracker, in response to a success in tracking the eye of the user; and detecting an area corresponding to the eye of the user in the third frame in response to a failure in tracking the eye of the user.

According to another aspect of the disclosure, there is provided a non-transitory computer-readable storage medium storing instructions that, when executed by a processor, cause the processor to perform the method.

According to another aspect of the disclosure, there is provided an eye tracking apparatus comprising: a memory configured to store an instruction; and a processor configured to execute the instruction to: detect an eye area corresponding to an eye of a user in a first frame of an image; determine an attribute of the eye area; select an eye tracker from a plurality of different eye trackers, the eye tracker corresponding to the determined attribute of the eye area;

and track the eye of the user in a second frame of the image based on the selected eye tracker, the second frame being subsequent to the first frame.

The processor maybe further configured to: analyze the detected eye area to detect at least one of a type of a light source, presence of glasses, presence of sunglasses, or presence of reflection of light; and determine the attribute of the detected eye area based on the at least one of the type of a light source, the presence of glasses, the presence of sunglasses, or the presence of reflection of light.

The processor maybe further configured to determine the attribute of the eye area based on an attribute classifier, and the attribute classifier maybe pretrained to output a classification result including at least one of a first attribute component associated with a type of a light source corresponding to a training image, a second attribute component associated with presence of glasses in the training image, a third attribute component associated with presence of sunglasses in the training image, or a fourth attribute component associated with presence of reflection of light in the training image, in response to an input of the training image.

The processor maybe further configured to: input the eye area to an attribute classifier, acquire, from the attribute classifier, a classification result including at least one of a first attribute component associated with a type of a light source corresponding to the first frame, a second attribute component associated with presence of glasses in the first frame, a third attribute component associated with presence of sunglasses in the first frame, or a fourth attribute component associated with presence of reflection of light in the first frame, and determine the attribute of the eye area based on the classification result.

The plurality of eye trackers may comprise: a first eye tracker configured to process an input image of a first attribute including glasses or sunglasses and reflection of light; a second eye tracker configured to process an input image of a second attribute including sunglasses in addition to the input image of the first attribute; and a third eye tracker configured to process an input image of a remaining attribute in addition to the input image of the first attribute and the input image of the second attribute.

The first eye tracker maybe pretrained based on a training image of the first attribute including the glasses or the sunglasses and reflection of light, the second eye tracker is pretrained based on a training image of the second attribute including the sunglasses in addition to the training image of the first attribute, and a third eye tracker is pretrained based on a training image of the third attribute in addition to the training image of the first attribute and the training image of the second attribute.

The processor maybe configured to detect the eye area using an eye detector, and the eye detector maybe pretrained based on training data including a visible image and an infrared ray (IR) image.

The processor maybe configured to change an operational state of an IR light source in response to a failure in detecting the eye area.

The processor maybe configured to verify whether the eye of the user is successfully detected in the second frame, to consecutively track the eye of the user in a third frame that is a subsequent frame of the second frame using the selected eye tracker, in response to a success in tracking the eye of the user, and to detect an area corresponding to the eye of the user in the third frame in response to a failure in tracking the eye of the user.

Each of the plurality of eye trackers maybe configured to operate based on different modalities.

BRIEF DESCRIPTION OF THE DRAWINGS

The above and/or other aspects will be more apparent by describing certain example embodiments with reference to the accompanying drawings, in which.

DETAILED DESCRIPTION

Figure 1:
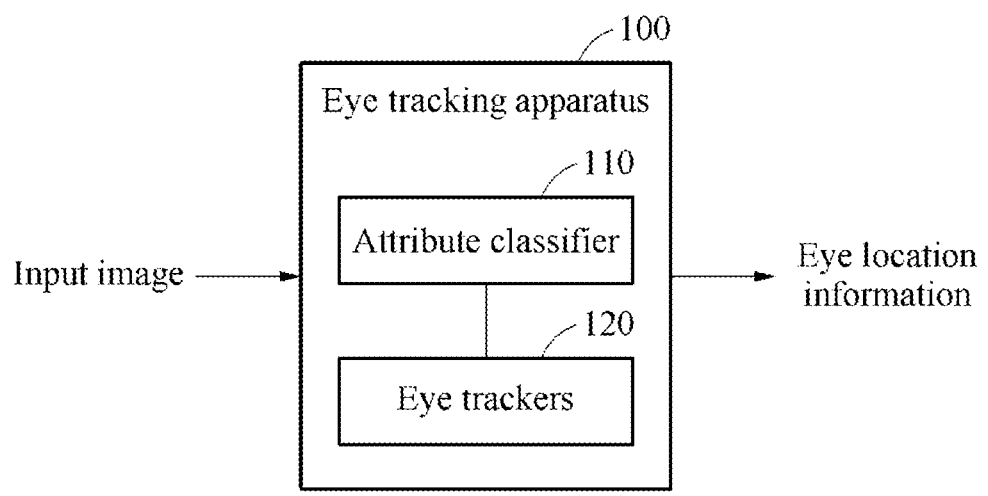
FIG. 1 illustrates an example of an eye tracking apparatus according to an example embodiment.

Reference will now be made in detail to example embodiments, examples of which are illustrated in the accompanying drawings, wherein like reference numerals refer to the like elements throughout. Example embodiments are described below in order to explain the disclosure by referring to the figures.

The following structural or functional descriptions are exemplary to merely describe the example embodiments, and the scope of the example embodiments is not limited to the descriptions provided in the disclosure. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the disclosure.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Also, when describing with reference to the accompanying drawings, like numerals refer to like elements throughout although they are illustrated in the different drawings and a repeated description related to is omitted here.

FIG. 1 illustrates an example of an eye tracking apparatus according to an example embodiment. Referring to FIG. 1, an eye tracking apparatus 100 includes an attribute classifier 110 and eye trackers 120. The eye tracking apparatus 100 may receive an input image, may track an eye of a user in the input image using the attribute classifier 110 and the eye trackers 120, and may output eye location information.

The eye tracking apparatus 100 may adaptively perform eye tracking based on an attribute of the input image. The input image may have various attributes based on a type of a light source, presence of glasses, presence of sunglasses, and presence of reflection of light. Here, the type of the light source may indicate whether light used for generating the input image is a visible ray or an infrared ray. For example, the input image may be classified into a visible image or an infrared ray (IR) image based on the type of the light. The presence of reflection of light may indicate whether light reflected from an object having a refractive property is included in the input image. For example, the object having the refractive property may include glasses and sunglasses.

In the case of using a single eye tracker for input images of various attributes, the tracking performance may be limited. For example, in the case of processing all of an input image including sunglasses and an input image not including sunglasses using a single eye tracker, a location of an eye may be inaccurately tracked. The input image including sunglasses needs to be processed in a different manner than that of the input image not including sunglasses.

The eye tracking apparatus 100 may determine an attribute of the input image using the attribute classifier 110. For example, the attribute classifier 110 may analyze the input image and may determine the attribute of the input image based on at least one of a type of a light source corresponding to the input image, presence of glasses, presence of sunglasses, and presence of reflection of light. The eye tracking apparatus 100 may select the eye tracker corresponding to the attribute of the input image from among the eye trackers 120 of different modalities, and may perform eye tracking using the selected eye tracker 120 The eye trackers 120 may be specialized for different attributes and may have different modalities, respectively.

The attribute classifier 110 and the eye trackers 120 may include a deep neural network (DNN). The DNN may include, for example, a fully connected network, a deep convolutional network (DCN), and a recurrent neural network (RNN). The DNN may perform an object classification, an object recognition, a voice recognition, and an image recognition by mapping input data and output data having a non-linear relationship based on deep learning. Here, deep learning refers to a machine learning scheme for solving an issue of an image recognition or a voice recognition occurring in a big data set. The input data and the output data may be mapped through supervised or unsupervised learning of deep learning.

Eye location information may be used to generate an autostereoscopic three-dimensional (3D) image. A most dominant factor among factors for recognizing a 3D image may be a disparity between images viewed at both eyes of the user. A method of providing different images to be viewed at both eyes of the user may include a glass method of filtering an image that requires a division by polarization, a division by time, and a wavelength division by different wavelength of primary color, and an autostereoscopic method of displaying each image only in a specific space using a 3D conversion device, for example, a parallax barrier, a lenticular lens, and a directional backlight unit (BLUE). The autostereoscopic method requires eye location information to render an image based on a location of the eye of the user. Eye location information output from the eye tracking apparatus 100 may be used to generate an autostereoscopic 3D image.

A head-up display (HUD) system refers to technology for displaying information required for driving as a virtual image in front of the user, for example, a driver. The HUD system may be applied to an augmented reality (AR) and a 3D display to overlappingly display a real object and a 3D virtual object for the user. The user may intuitively recognize information required for driving through the 3D virtual object that overlaps the real object. To realize such 3D AR HUD technology, different images need to be provided to both eyes of the user and a relationship between the 3D virtual object and the real object and the eyes of the user need to be considered. Eye location information output from the eye tracking apparatus 100 may be used at the 3D AR HUD system to specify the location of the eye of the user.

Figure 2:
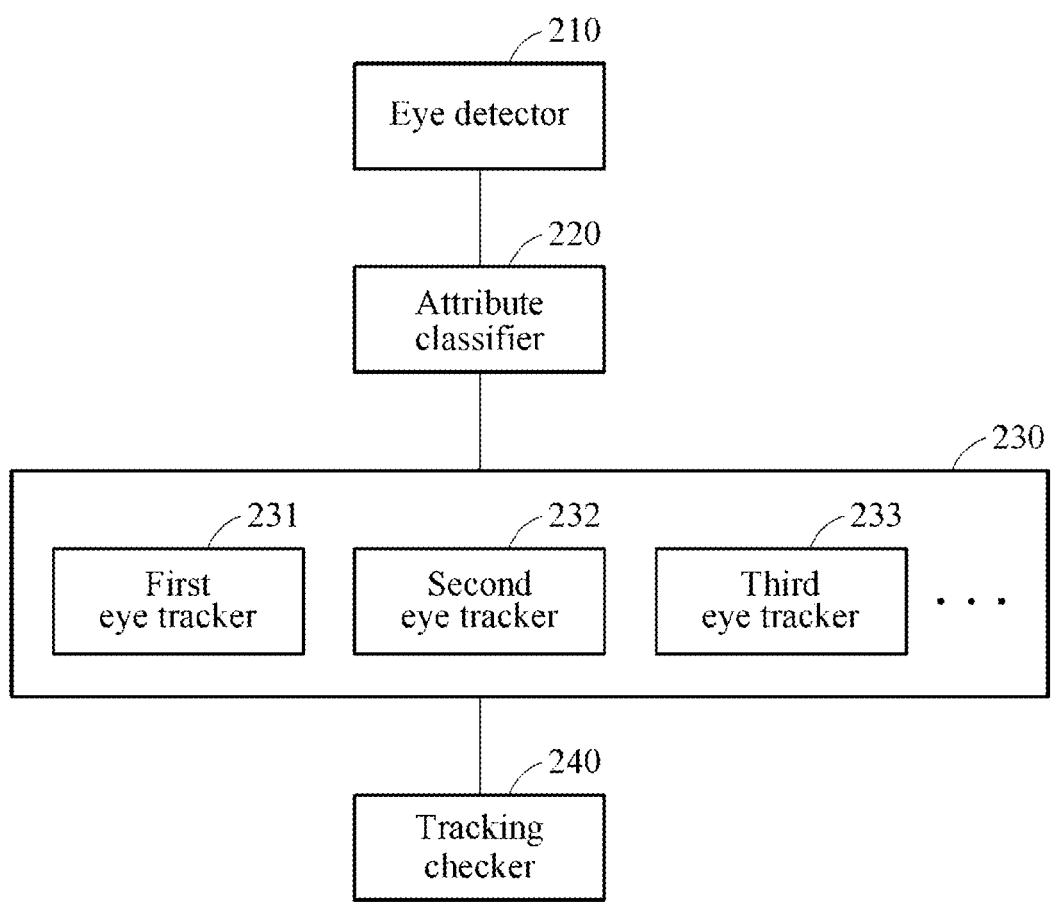
FIG. 2 illustrates an example of a configuration of an eye tracking apparatus according to an example embodiment.

FIG. 2 illustrates an example of a configuration of an eye tracking apparatus according to an example embodiment. Referring to FIG. 2, an eye tracking apparatus 200 includes an eye detector 210, an attribute classifier 220, eye trackers 230, and a tracking checker 240. The following operation of the eye detector 210, the attribute classifier 220, the eye trackers 230, and the tracking checker 240 may also be represented as an operation of the eye tracking apparatus 200.

The eye detector 210, the attribute classifier 220, the eye trackers 230, and the tracking checker 240 may be implemented using at least one software module, at least one hardware module, or various combinations thereof. For example, the eye detector 210, the attribute classifier 220, the eye trackers 230, and the tracking checker 240 may include a neural network. The neural network may be implemented using at least one software module, at least one hardware module, or various combinations thereof.

Once an eye area is detected using the eye detector 210, the eye tracking apparatus 200 may continuously track an eye of a user using the eye trackers 230. Eye tracking refers to a method of searching for the eye of the user in a relatively narrow area compared to eye detection. Since the search range is reduced, an amount of time and resources used to retrieve a location of the eye of the user may decrease.

The eye detector 210 detects an eye area in an input image. The eye area detected by the eye detector 210 may also be referred to as a detection area. A location and a size of the detection area may be specified. Depending on example embodiments, the size of the detection area may be determined in advance and the location of the detection area may be determined by the eye detector 210. The eye detector 210 may be pretrained to detect an eye area in both a visible image and an IR image. For example, the eye detector 210 may be pretrained based on training data that includes the visible image having a relatively high eye detection difficulty and the IR image having a relatively high eye detection difficulty. An image having a relatively high eye detection difficulty may correspond to error data. A process of training the eye detector 210 will be described below.

A pre-trained neural network may indicate that the neural network is trained before the neural network starts. The neural network may be trained based on training data in a training stage and may perform an inference operation, such as classification, recognition, and detection, on input data in an inference stage. A neural network that starts may indicate that the neural network is ready for inference. For example, the neural network that starts may indicate that the neural network is loaded to a memory, or that input data for inference is input to the neural network after the neural network is loaded to the memory.

The attribute classifier 220 determines an attribute of the detected eye area. The attribute classifier 220 may analyze the detected eye area and may determine the attribute of the eye area based on at least one of a type of a light source, presence of glasses, presence of sunglasses, and presence of reflection of light. Analyzing the eye area may include analyzing an image corresponding to an eye area that is a portion of the input image. The attribute classifier 220 may be pretrained to output a classification result including at least one of a first attribute component associated with a type of a light source corresponding to a training image, a second attribute component associated with presence of glasses in the training image, a third attribute component associated with presence of sunglasses in the training image, and a fourth attribute component associated with presence of reflection of light in the training image, in response to an input of the training image.

The eye trackers 230 may include eye trackers 231, 232, and 233 that are also referred to as a first eye tracker 231, a second eye tracker 232, and a third eye tracker 233, respectively. Although FIG. 2 illustrates three eye trackers 230 including the first to third eye trackers 231, 232, and 233, the eye trackers 230 may include at least two eye trackers 230 or at least four eye trackers 230. An eye tracking process of the eye trackers 230 will be described below.

Each of the eye trackers 230 may have a different modality. The eye trackers 230 may be trained to be specialized for different attributes and may have different modalities, respectively. For example, the first eye tracker 231 may be pretrained based on a training image of a first attribute including glasses or sunglasses and reflection of light, the second eye tracker 232 may be pretrained based on a training image of a second attribute including sunglasses in addition to the training image of the first attribute, and the third eye tracker 233 may be pretrained based on a training image of a remaining attribute in addition to the training image of the first attribute and the training image of the second attribute. Accordingly, the first eye tracker 231 may be specialized to process the input image of the first attribute, the second eye tracker 232 may be specialized to process the input image of the second attribute, and the eye tracker 233 may be specialized to process the input image of the third attribute.

The eye tracking apparatus 200 may select the eye tracker 230 corresponding to the attribute of the eye area determined by the attribute classifier 220 from among the eye trackers 230. For example, if a classification result corresponds to the first attribute, the eye tracking apparatus 200 may select the third eye tracker 231 from among the eye trackers 230. The eye tracking apparatus 200 may track the eye of the user in the input image using the selected eye tracker 230.

The tracking checker 240 may continuously verify whether eye tracking is a success. For example, the tracking checker 240 may verify whether an object tracked by the selected eye tracker 230 corresponds to an actual eye of the user. The tracking checker 240 may be pretrained to verify whether an object in the training image corresponds to the eye of the user. The tracking checker 240 may be trained based on training images of various attributes to process various outputs of the eye trackers 230.

Figure 3:
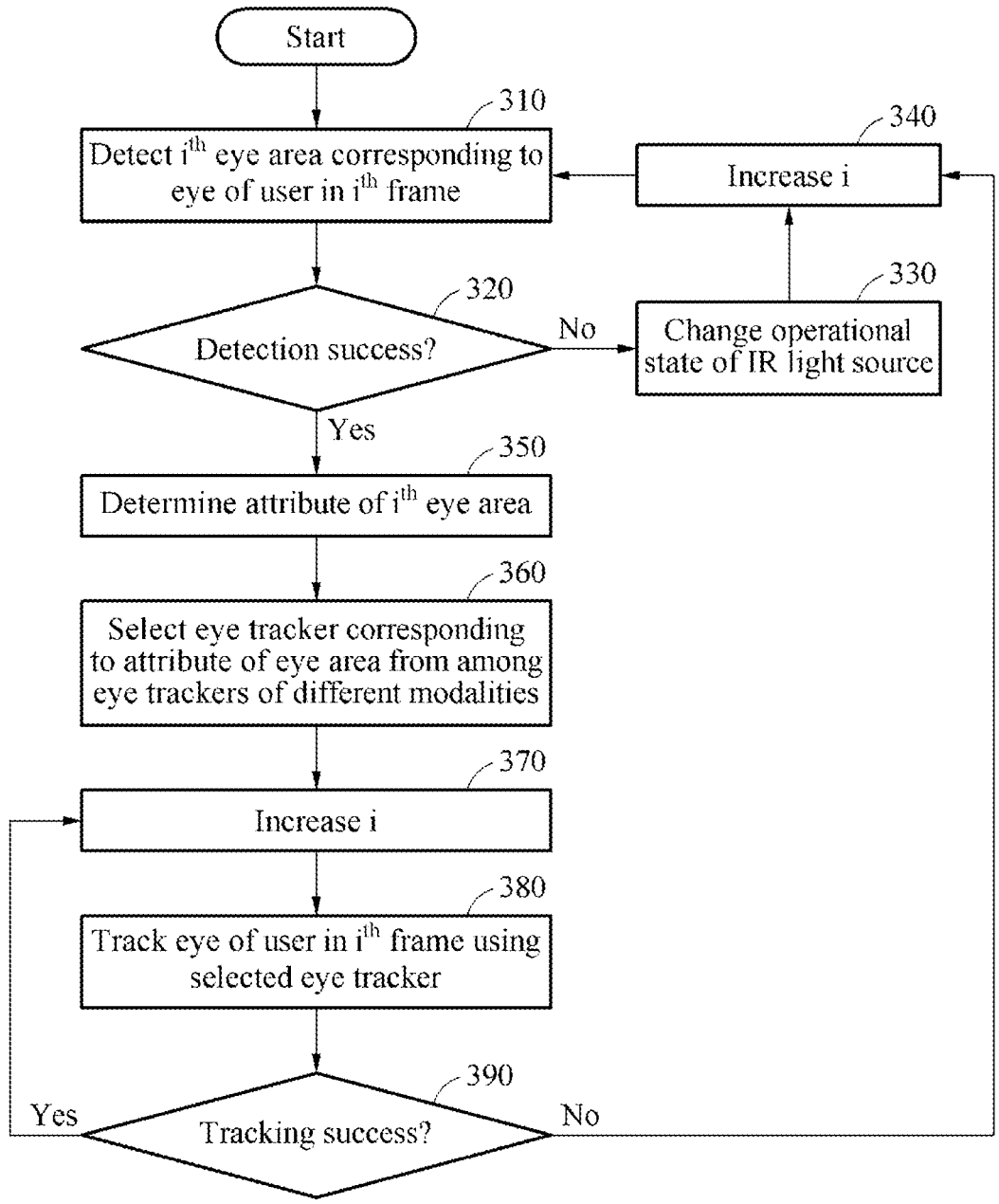
FIG. 3 illustrates an example of an eye tracking method according to an example embodiment.

FIG. 3 illustrates an example of an eye tracking method according to an example embodiment.

Referring to FIG. 3, in operation 310, an eye tracking apparatus detects an $i^{th}$ eye area corresponding to an eye of a user in an $i^{th}$ frame of an input image. The input image may include a plurality of frames. Here, i denotes an index for identifying each of the plurality of frames included in the input image. Operation 310 may be performed using an eye detector.

In operation 320, the eye tracking apparatus determines whether detection of the eye area is a success. If the detection of the eye area is a failure, operation 330 is performed, and otherwise, operation 340 is performed.

In operation 330, the eye tracking apparatus changes an operational state of an IR light source. The operational state of the IR light source may include turn-ON and turn-OFF. The eye detector may be pretrained to process all of a visible image and an IR image. Accordingly, an environment in which detection of the eye area may succeed may be provided to the eye detector by changing the operational state of the IR light source. For example, if the IR light source is turned ON in a low illuminance environment, the eye detector may successfully detect the eye area.

In operation 340, i increases. An increase in i indicates that a frame to be processed moves to a subsequent frame. For example, if the eye detector fails in detecting the eye area in a first frame, the eye detector may attempt to detect the eye area in a second frame after the operational state of the IR light source is changed. The second frame is a subsequent frame of the first frame.

In operation 350, the eye tracking apparatus determines an attribute of the $i^{th}$ eye area. Operation 350 may be performed using an attribute classifier. For example, the eye tracking apparatus may input the eye area to the attribute classifier, may acquire a classification result including at least one attribute component from the attribute classifier, and may determine the attribute of the eye area based on the classification result. In operation 360, the eye tracking apparatus selects an eye tracker corresponding to the attribute of the eye area from among eye trackers of different modalities.

In operation 370, i increases. In operation 380, the eye tracking apparatus tracks the eye of the user in the $i^{th}$ frame using the selected eye tracker. For example, once the eye detector detects the eye area in the first frame, the eye tracker may attempt to track the eye in a second frame. The eye tracking apparatus may extract feature points of the eye of the user from the eye area, may determine a tracking area in which the eye of the user is to be tracked based on the extracted feature points, and may track the eye of the user in the $I^{th}$ frame based on the tracking area.

In operation 390, the eye tracking apparatus determines whether the eye of the user is successfully tracked in the $i^{th}$ frame. Operation 390 may be performed using a tracking checker. If the eye of the user is successfully detected in the $i^{th}$ frame, operation 370 may be performed. For example, i increases in operation 370 and the eye tracking apparatus may continuously track the eye of the user in a third frame using the selected eye tracker in operation 380. On the contrary, if the eye tracking is a failure, operation 340 may be performed. For example, i increases in operation 340 and the eye tracking apparatus may detect an area corresponding to the eye of the user in the third frame. The third frame refers to a subsequent frame of the second frame.

Figure 4:
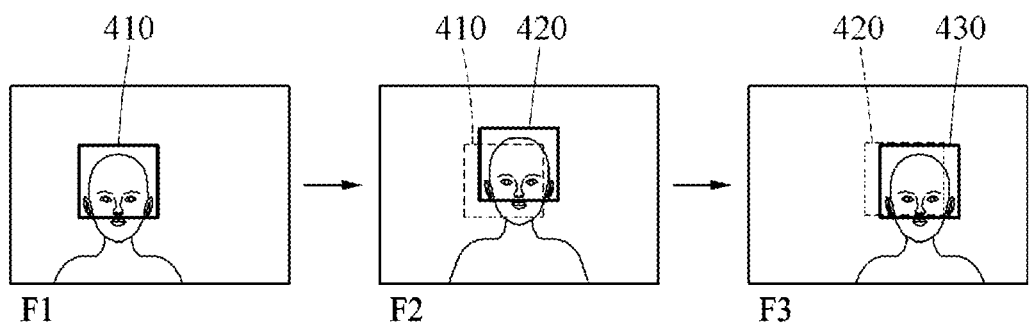
FIG. 4 illustrates an example of an eye area and a tracking area according to an example embodiment.

FIG. 4 illustrates an example of an eye area and a tracking area according to an example embodiment. FIG. 4 illustrates a plurality of frames F1, F2, and F3 of an input image.

Referring to FIG. 4, an eye tracker detects an eye area by searching the entire area of the frame F1, and determines a tracking area 410 based on feature points of an eye of a user that are extracted from the eye area. Since the tracking area 410 of the frame F1 includes the eye of the user, a tracking checker may determine that tracking the eye of the user is a success. In this case, the eye tracker may track the eye of the user in a subsequent frame using the tracking area 410. That is, since the tracking area 410 corresponds to the eye of the user, object detection is not performed again in the frame F2.

The eye of the user may be positioned at an upper right end in the frame F2 compared to a location of the eye of the user in the frame F1. The eye tracker extracts feature points of the eye of the user from the tracking area 410 in the frame F2. The eye tracker newly determines a tracking area 420 based on the feature points that are extracted from the tracking area 410 in the frame F2. For example, the eye tracker may determine, as the tracking area 420, an area including the feature points extracted from the tracking area 410 at the center. Since the tracking area 420 in the frame F2 includes the eye of the user, the tracking checker may determine that tracking the eye of the user is a success. In this case, the eye tracker may continuously track the eye of the user in a subsequent frame, that is, the frame F3 using the tracking area 420.

Similar to frame F2, feature points of the eye of the user are extracted from the tracking area 420 in the frame F3 and a tracking area 430 is newly determined.

As described above, according to an example embodiment, when a tracking area is verified to correspond to an eye of a user, the eye tracking apparatus may track the eye of the user without performing an additional detection operation. If the tracking area does not correspond to the eye of the user, that is, if eye tracking is a failure, the eye tracking apparatus may detect an eye area in a subsequent frame using the eye detector.

Figure 5:
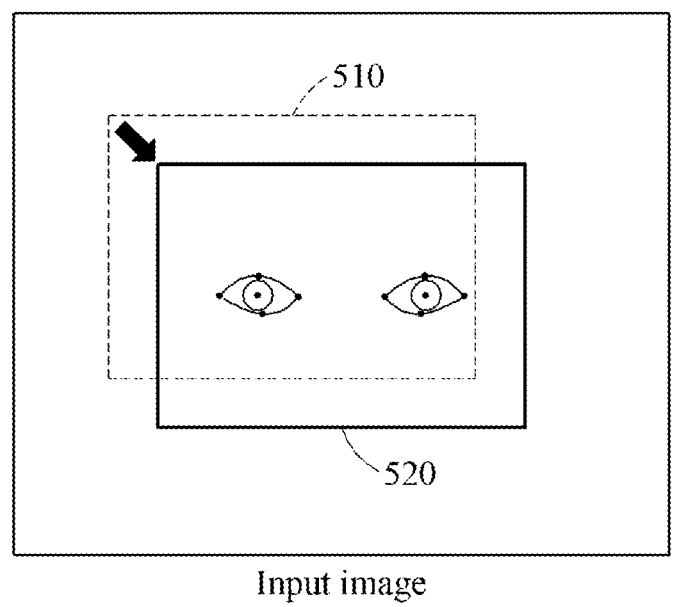
FIG. 5 illustrates an example of a process of determining a tracking area according to an example embodiment.

FIG. 5 illustrates an example of a process of determining a tracking area according to an example embodiment. FIG. 5 illustrates a detection area 510 and a tracking area 520.

When the detection area 510 is determined using an eye detector, an eye tracker may determine the tracking area 520. The eye tracker may align an object by extracting feature points of an eye of a user from the detection area 510. For example, an eye tracker may identify a geometric structure of the eye of the user by extracting feature points corresponding to a shape of the eye of the user from a partial image corresponding to the detection area 510. The eye tracker may align the object and may determine the tracking area 520 in which the eye of the user is to be tracked based on the feature points.

The eye tracker may determine the tracking area 520 so that the feature points may be positioned at the center of the tracking area 520. A size of the tracking area 520 may be determined based on a distribution of feature points or may be determined in advance. When the tracking area 520 is verified to correspond to the eye of the user, the tracking area 520 may be reused to track the eye of the user in a subsequent frame. Since a target object in a current frame is positioned around the center of the tracking area 520, the target object is highly likely to be present within the tracking area 520 even in a subsequent frame. Accordingly, the target object may be continuously positioned within the tracking area 520 by moving the tracking area 520 little by little. The eye tracker may continuously track the target object using the tracking area 520 without performing an additional detection operation on the entire area of the input image.

The eye tracker may output location information of the eye in the tracking area 520. The location information of the eye may specify a 3D location of the eye. If the input image is a stereo image, the 3D location of the eye may be specified using the stereo image. Alternatively, if the input image is a mono image, the 3D location of the eye may be specified using the mono image and an inter-pupillary distance (IPD). Here, the IPD may be a value input from the user or a predefined value.

Figure 6:
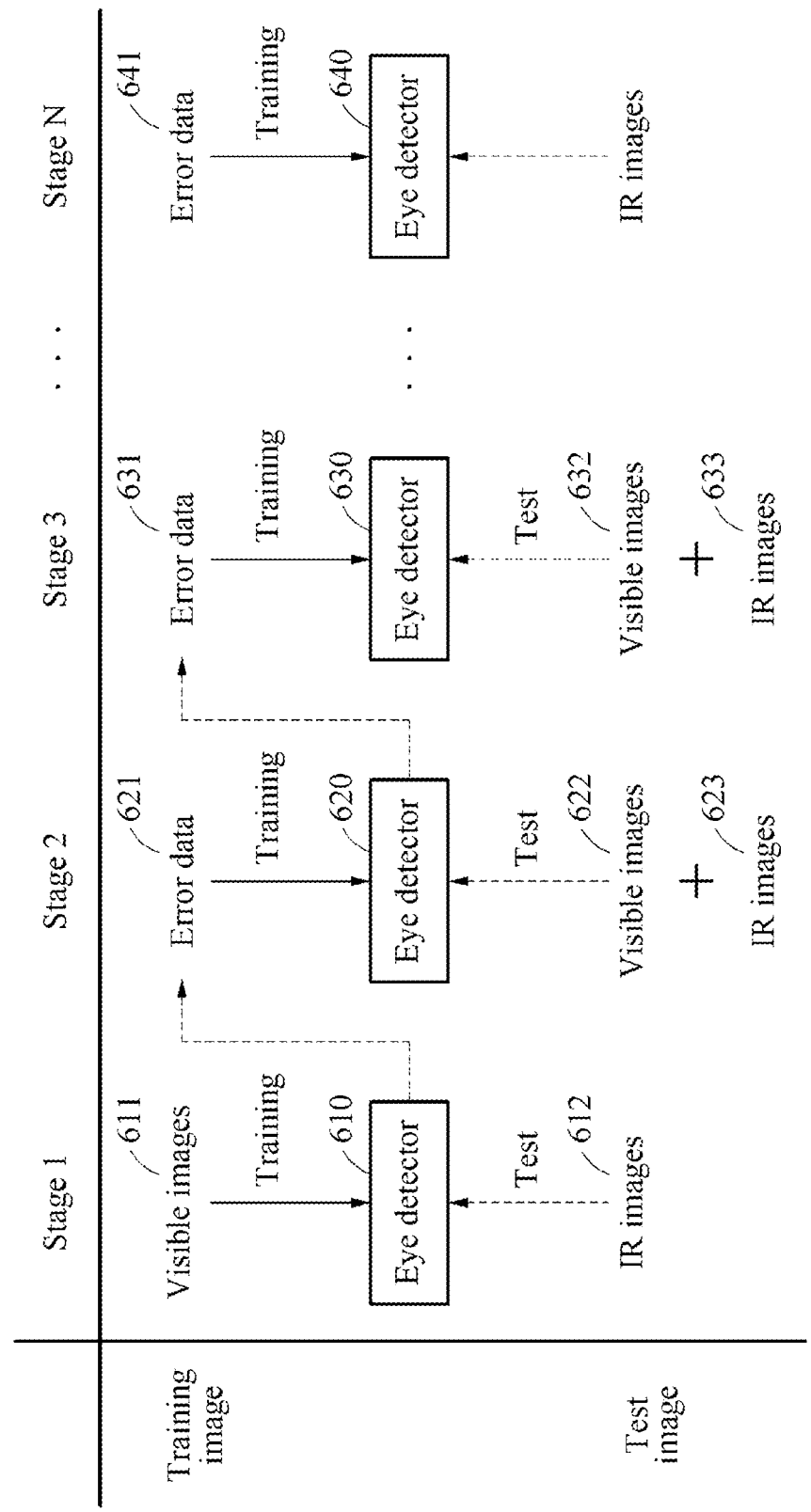
FIG. 6 illustrates an example of a process of training an eye detector according to an example embodiment.

FIG. 6 illustrates an example of a process of training an eye detector according to an example embodiment. A training process may include stage 1 to stage N. A value of N may be adjusted based on capacity of an eye detector 640 trained in stage N. The eye detector 640 is trained based on a visible image and an IR image and thus, may process all of the visible image and the IR image.

Referring to FIG. 6, in stage 1, an eye detector 610 is trained based on visible images 611. A variety of machine learning, such as deep learning, may be used to train the eye detector 610. For example, the eye detector 610 may be trained through backpropagation based on whether an eye area determined by the eye detector 610 corresponds to a label of the visible images 611. A weight of a neural network may be adjusted through the training process. The aforementioned deep learning-based training may be performed even in other stages.

When the eye detector 610 is trained based on the visible images 611, IR images 612 may be input to the eye detector 610 as test images. The eye detector 610 may succeed in detecting the eye in a portion of the IR images 612 and may fail in detecting the eye in another portion thereof. The IR images 612 in which the eye is not detected may be classified into error data 621. Here, the term "error data" indicates data in which detection of a target object, for example, the eye of the user, fails among training data. For example, the error data 621 may include first error data occurring due to the eye detector 610 fails in detecting the eye of the user and second error data occurring due to the eye detector 610 erroneously detecting another object as the eye of the user. A test for determining the error data 621 may be performed in an environment in which a false acceptance rate (FAR) is preset. In other stages, corresponding error data may be determined in the same manner as described above.

In stage 2, an eye detector 620 is trained based on the error data 621. The eye detector 620 corresponds to the eye detector 610 that is trained based on the visible images 611. When the eye detector 620 is trained based on the error data 621, visible images 622 and IR images 623 may be input to the eye detector 620 as test images. A portion of the visible images 622 and the IR images 623 may be classified into error data 631.

Stage 3 may proceed in a similar manner as stage 2. In stage 3, an eye detector 630 is trained based on the error data 631. The eye detector 630 corresponds to the eye detector 620 that is trained based on the error data 621. When the eye detector 630 is trained based on the error data 631, visible images 632 and IR images 633 may be input to the eye detector 630 as test images. A portion of the visible images 632 and the IR images 633 may be classified into error data.

The aforementioned stages may iterate and a portion of test images in N−1 stage may be classified into error data 641. In stage N, the eye detector 640 is trained based on the error data 641 and the training process is terminated. Since the eye detector 640 is trained based on visible images and IR images, the eye detector 640 may be robust for both the visible images and the IR images.

Figure 7:
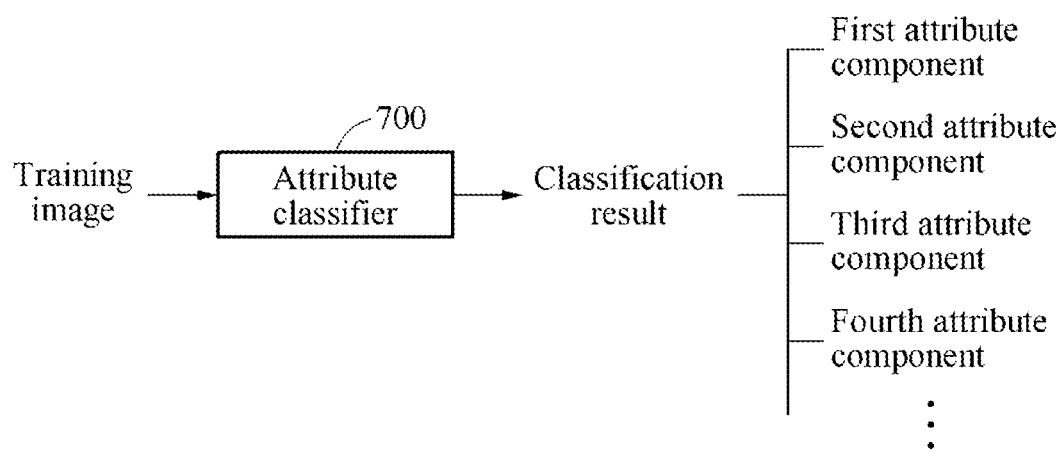
FIG. 7 illustrates an example of a process of training an attribute classifier according to an example embodiment.

FIG. 7 illustrates an example of a process of training an attribute classifier according to an example embodiment. Referring to FIG. 7, an attribute classifier 700 may be trained to output a classification result corresponding to a training image.

The classification result may include a plurality of attribute components associated with the training image. For example, the classification result may include at least one of a first attribute component associated with a type of a light source corresponding to the training image, a second attribute component associated with presence of glasses in the training image, a third attribute component associated with presence of sunglasses in the training image, and a fourth attribute component associated with presence of reflection of light in the training image.

For example, the classification result may be represented as (r1, r2, r3, r4). Here, r1 may correspond to the first attribute component, r2 may correspond to the second attribute component, r3 may correspond to the third attribute component, and r4 may correspond to the fourth attribute component. Each of r1, r2, r3, and r4 may have a value of either 1 or 0. If r1=0, it may indicate a visible image. If r1=1, it may indicate an IR image. If r2=0, it may indicate absence of glasses. If r2=1, it may indicate presence of glasses. If r3=0, it may indicate absence of sunglasses. If r3=1, it may indicate absence of sunglasses. If r4=0, it may indicate absence of reflection of light. If r4=1, it may indicate presence of reflection of light.

An attribute of an image may be determined based on attribute components of the classification result. For example, the attribute of the image may include a first attribute indicating presence of glasses or sunglasses and reflection of light, a second attribute not corresponding to the first attribute and indicating presence of sunglasses, and a third attribute not corresponding to the first attribute and the second attribute. A classification result of (0, 1, x, 1) and (1, 0, x, 1) may correspond to the first attribute, a classification result of (0, 1, x, 0) may correspond to the second attribute, and a remaining classification result may correspond to the third attribute. Here, x is 0 or 1. The aforementioned attributes, attribute components, and relationships between the attributes and the attribute component are provided as examples only and other various attributes, attribute components, and relationships between the other various attributes and attribute components may be defined.

Figure 8:
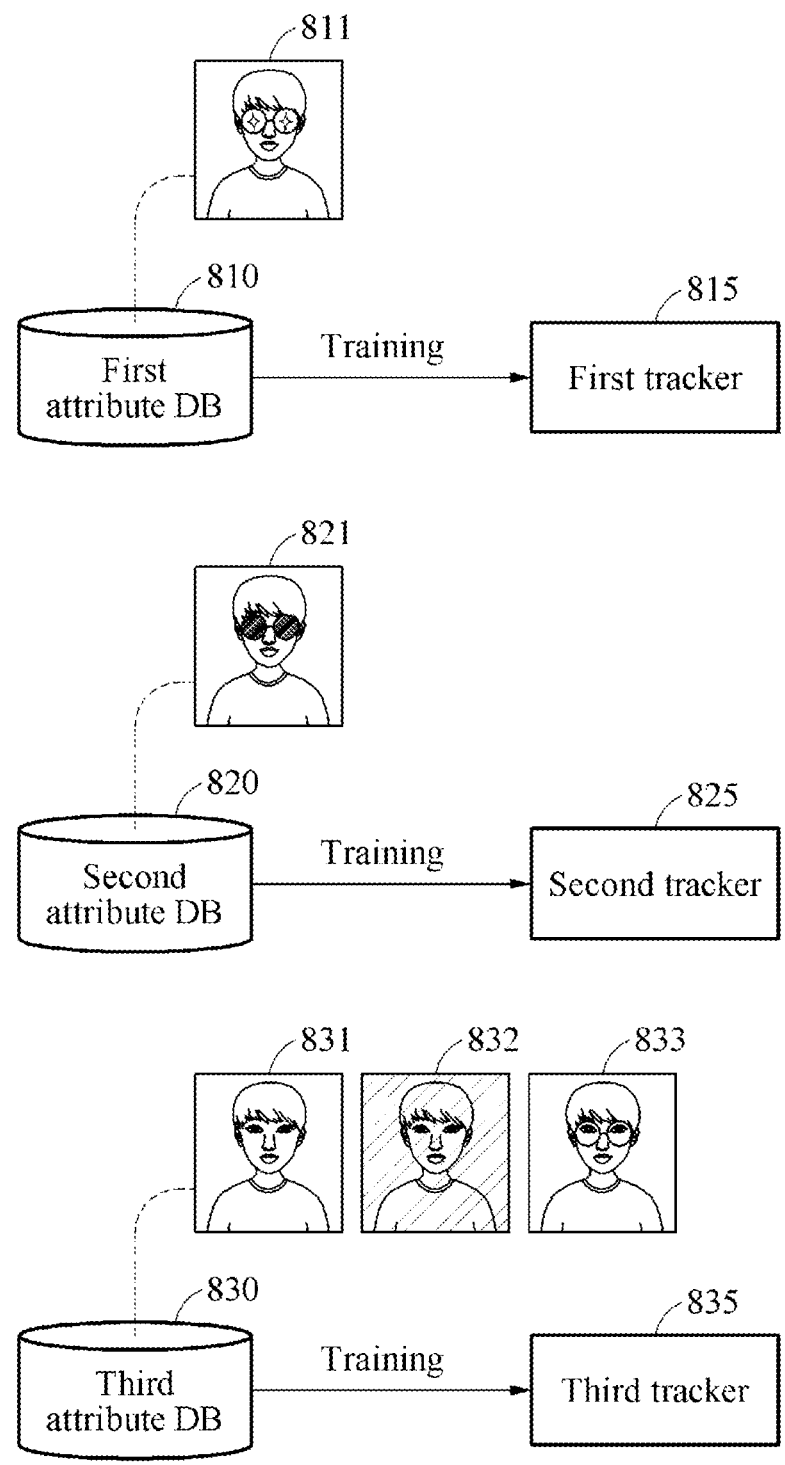
FIG. 8 illustrates an example of a process of training trackers according to an example embodiment.

FIG. 8 illustrates an example of a process of training trackers according to an example embodiment. Referring to FIG. 8, trackers including a first tracker 815, a second tracker 825, and a third tracker 835 are trained based on databases corresponding to different attributes, respectively.

Referring to FIG. 8, the first tracker 815 may be trained to perform an eye tracking operation based on a first attribute database (DB) 810, the second tracker 825 may be trained to perform an eye tracking operation based on a second attribute DB 820, and the third tracker 835 may be trained to perform an eye tracking operation based on a third attribute DB 830. Accordingly, the first to third trackers 815, 825, and 835 may be specialized to track an eye of a user in images of different attributes.

The first attribute DB 810 may include a training image 811 of a first attribute indicating presence of glasses or sunglasses and reflection of light, the second attribute DB 820 may include a training image 821 of a second attribute not corresponding to the first attribute and indicating presence of sunglasses, and the third attribute DB 830 may include training images 831, 832, and 833 of a third attribute not corresponding to the first attribute and the second attribute.

According to the example described above with reference to FIG. 7, the training image 811 may correspond to a classification result of (1, 0, 0, 1), the training image 821 may correspond to a classification result of (0, 1, 0, 0), the training image 831 may correspond to a classification result of (0, 0, 0, 0), the training image 832 may correspond to a classification result of (0, 0, 1, 0), and the training image 833 may correspond to a classification result of (1, 0, 0, 0). The aforementioned attributes, attribute components, and relationships between the attributes and the attribute component are provided as examples only and other various attributes, attribute components, and relationships between the other various attributes and attribute components may be defined.

Figure 9:
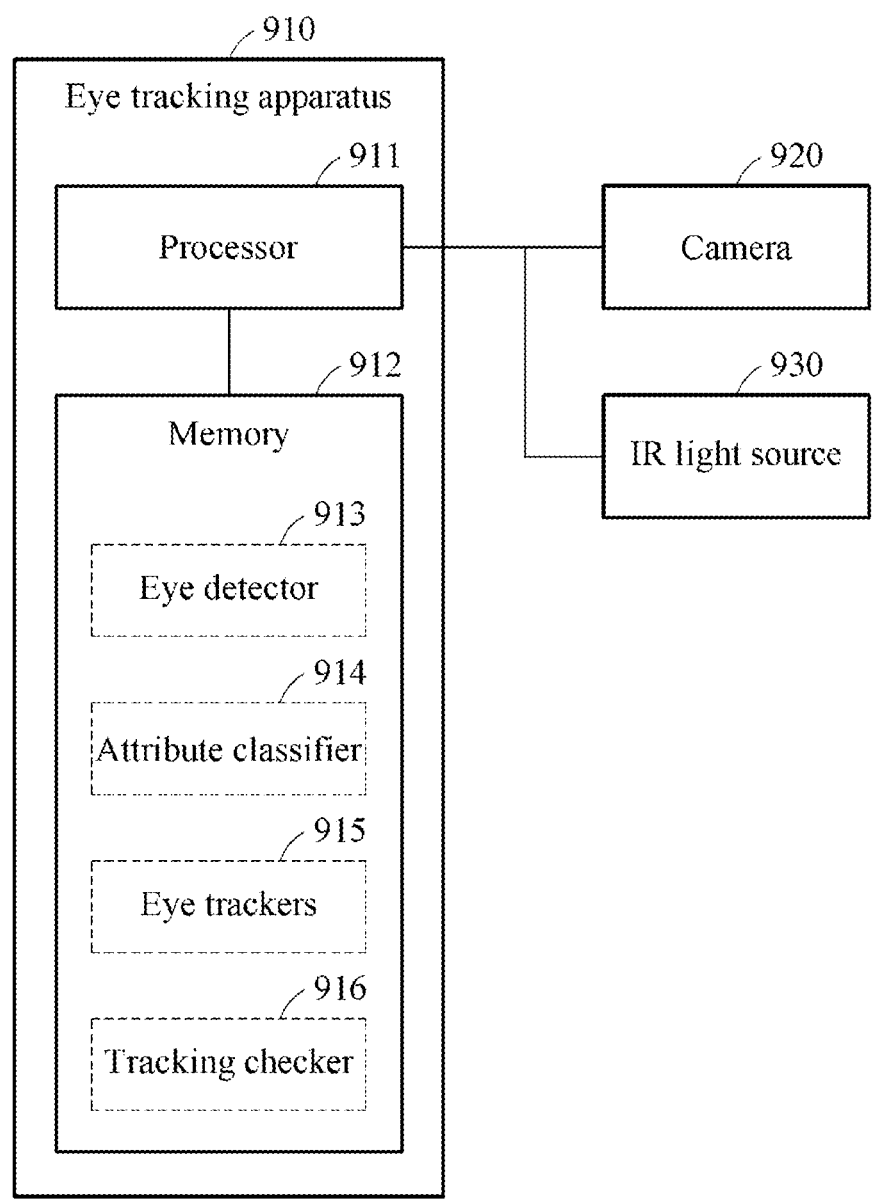
FIG. 9 illustrates an example of an eye tracking system according to an example embodiment.

FIG. 9 illustrates an example of an eye tracking system according to an example embodiment. Referring to FIG. 9, an eye tracking system 900 includes an eye tracking apparatus 910, a camera 920, and an IR light source 930.

The eye tracking apparatus 910 includes a processor 911 and a memory 912. The memory 912 stores an instruction readable at the processor 911. In response to the instruction stored in the memory 912 being executed at the processor 911, the processor 911 may perform the aforementioned eye detection operation. For example, the processor 911 may detect an eye area corresponding to an eye of a user in a first frame, may determine an attribute of the eye area, may select an eye tracker corresponding to the determined attribute of the eye area from among eye trackers of different modalities, and may track the eye of the user in a second frame that is a subsequent frame of the first frame using the selected eye tracker.

The memory 912 may include an eye detector 913, an attribute classifier 914, eye trackers 915, and a tracking checker 916. The processor 911 may use the eye detector 913, the attribute classifier 914, the eye trackers 915, and the tracking checker 916 to perform the aforementioned eye detection operation.

The camera 920 may generate a still image or a video image or may generate the still image and the video image. A generated image may be provided to the eye tracking apparatus 910 as an input image. The camera 920 may be a stereo camera or a mono camera. If the input image is a stereo image, a 3D location of the eye may be specified using the stereo image. If the input image is a mono image, the 3D location of the eye may be specified using the mono image and an IPD.

The IR light source 930 may emit IR light toward the user. For example, the IR light source 930 may be an IR light emitting diode (LED). The processor 911 may change an operational state of the IR light source 930 depending on whether the eye of the user is successfully detected in the input image.

The example embodiments described herein may be implemented using hardware components, software components, and/or combination thereof. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include plurality of processing elements and plurality of types of processing elements. For example, a processing device may include plurality of processors or a processor and a controller. In addition, different processing configurations are possible, such parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The foregoing example embodiments are examples and are not to be construed as limiting. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. An eye tracking method comprising:
    detecting an eye area corresponding to an eye of a user in a first frame of an image;
    determining an attribute of the eye area based on an attribute classifier pretrained to output a classification result including an attribute component;
    selecting an eye tracker from a plurality of different eye trackers, the eye tracker corresponding to the determined attribute of the eye area; and
    tracking the eye of the user in a second frame of the image based on the selected eye tracker, the second frame being subsequent to the first frame,
    wherein the attribute classifier is pretrained to output the classification result including at least one of a first attribute component associated with a type of a light source corresponding to a training image, a second attribute component associated with presence of glasses in the training image, a third attribute component associated with presence of sunglasses in the training image, or a fourth attribute component associated with presence of reflection of light in the training image, in response to an input of the training image.

2. The method of claim 1, wherein the determining the attribute of the eye area comprises:
    analyzing the eye area to detect at least one of the type of the light source, the presence of the glasses, the presence of the sunglasses, or the presence of the reflection of the light; and
    determining the attribute of the eye area based on the at least one of the type of the light source, the presence of glasses, the presence of the sunglasses, or the presence of the reflection of the light.

3. The method of claim 1, wherein the determining of the attribute of the eye area comprises:
    inputting the eye area to the attribute classifier;
    acquiring, from the attribute classifier, the classification result including at least one of the first attribute component associated with the type of the source corresponding to the first frame, the second attribute component associated with the presence of the glasses in the first frame, the third attribute component associated with the presence of the sunglasses in the first frame, or the fourth attribute component associated with the presence of the reflection of the light in the first frame; and
    determining the attribute of the eye area based on the classification result.

4. The method of claim 1, wherein the plurality of eye trackers comprise:
    a first eye tracker configured to process an input image of a first attribute including the glasses or the sunglasses and the reflection of the light;
    a second eye tracker configured to process an input image of a second attribute including the sunglasses in addition to the input image of the first attribute; and
    a third eye tracker configured to process an input image of a third attribute in addition to the input image of the first attribute and the input image of the second attribute.

5. The method of claim 4, wherein the first eye tracker is pretrained based on a training image of the first attribute including the glasses or the sunglasses and the reflection of the light, the second eye tracker is pretrained based on a training image of the second attribute including the sunglasses in addition to the training image of the first attribute, and the third eye tracker is pretrained based on a training image of the third attribute in addition to the training image of the first attribute and the training image of the second attribute.

6. The method of claim 1, wherein the eye area is detected using an eye detector, and
    the eye detector is pretrained based on training data including a visible image and an infrared ray (IR) image.

7. The method of claim 1, wherein the tracking of the eye of the user comprises:
    extracting feature points of the eye of the user from the eye area;

determining a tracking area in which the eye of the user is to be tracked based on the extracted feature points; and tracking the eye of the user in the second frame based on the tracking area.

8. The method of claim 1, further comprising:
changing an operational state of an IR light source in response to a failure in detecting the eye area.

9. The method of claim 1, further comprising:
verifying whether the eye of the user is successfully detected in the second frame;
consecutively tracking the eye of the user in a third frame that is a subsequent frame of the second frame using the selected eye tracker, in response to a success in tracking the eye of the user; and
detecting an area corresponding to the eye of the user in the third frame in response to a failure in tracking the eye of the user.

10. A non-transitory computer-readable storage medium storing instructions that, when executed by a processor, cause the processor to perform the method of claim 1.

11. The method of claim 1, wherein each of the plurality of eye trackers are configured to operate based on different modalities.

12. An eye tracking apparatus comprising:
a memory configured to store an instruction; and
a processor configured to execute the instruction to:
   detect an eye area corresponding to an eye of a user in a first frame of an image;
   determine an attribute of the eye area based on an attribute classifier pretrained to output a classification result including an attribute component;
   select an eye tracker from a plurality of different eye trackers, the eye tracker corresponding to the determined attribute of the eye area; and
   track the eye of the user in a second frame of the image based on the selected eye tracker, the second frame being subsequent to the first frame,
wherein the attribute classifier is pretrained to output the classification result including at least one of a first attribute component associated with a type of a light source corresponding to a training image, a second attribute component associated with presence of glasses in the training image, a third attribute component associated with presence of sunglasses in the training image, or a fourth attribute component associated with presence of reflection of light in the training image, in response to an input of the training image.

13. The eye tracking apparatus of claim 12, wherein the processor is further configured to:
analyze the detected eye area to detect at least one of the type of the light source, the presence of the glasses, the presence of the sunglasses, or the presence of the reflection of the light; and
determine the attribute of the detected eye area based on the at least one of the type of the light source, the presence of glasses, the presence of the sunglasses, or the presence of the reflection of the light.

14. The eye tracking apparatus of claim 12, wherein the processor is further configured to:

input the eye area to the attribute classifier,
acquire, from the attribute classifier, the classification result including at least one of the first attribute component associated with the type of the source corresponding to the first frame, the second attribute component associated with the presence of the glasses in the first frame, the third attribute component associated with the presence of the sunglasses in the first frame, or the fourth attribute component associated with the presence of the reflection of the light in the first frame; and
determine the attribute of the eye area based on the classification result.

15. The eye tracking apparatus of claim 12, wherein the plurality of eye trackers comprise:
a first eye tracker configured to process an input image of a first attribute including the glasses or the sunglasses and the reflection of the light;
a second eye tracker configured to process an input image of a second attribute including the sunglasses in addition to the input image of the first attribute; and
a third eye tracker configured to process an input image of a remaining attribute in addition to the input image of the first attribute and the input image of the second attribute.

16. The eye tracking apparatus of claim 15, wherein the first eye tracker is pretrained based on a training image of the first attribute including the glasses or the sunglasses and reflection of light, the second eye tracker is pretrained based on a training image of the second attribute including the sunglasses in addition to the training image of the first attribute, and the third eye tracker is pretrained based on a training image of the third attribute in addition to the training image of the first attribute and the training image of the second attribute.

17. The eye tracking apparatus of claim 12, wherein the processor is further configured to detect the eye area using an eye detector, and
the eye detector is pretrained based on training data including a visible image and an infrared ray (IR) image.

18. The eye tracking apparatus of claim 12, wherein the processor is further configured to change an operational state of an IR light source in response to a failure in detecting the eye area.

19. The eye tracking apparatus of claim 12, wherein the processor is further configured to verify whether the eye of the user is successfully detected in the second frame, to consecutively track the eye of the user in a third frame that is a subsequent frame of the second frame using the selected eye tracker, in response to a success in tracking the eye of the user, and to detect an area corresponding to the eye of the user in the third frame in response to a failure in tracking the eye of the user.

20. The eye tracking apparatus of claim 12, wherein each of the plurality of eye trackers are configured to operate based on different modalities.

* * * * *